(12) United States Patent
Lawson et al.

(10) Patent No.: US 8,638,781 B2
(45) Date of Patent: Jan. 28, 2014

(54) METHOD AND SYSTEM FOR PRESERVING TELEPHONY SESSION STATE

(75) Inventors: Jeffrey Lawson, San Francisco, CA (US); John Wolthuis, San Francisco, CA (US); Evan Cooke, San Francisco, CA (US)

(73) Assignee: Twilio, Inc., San Francisco, CA (US)

( * ) Notice: Subject to any disclaimer, the term of this patent is extended or adjusted under 35 U.S.C. 154(b) by 268 days.

(21) Appl. No.: 13/009,831

(22) Filed: Jan. 19, 2011

(65) Prior Publication Data
US 2011/0176537 A1 Jul. 21, 2011

Related U.S. Application Data

(60) Provisional application No. 61/296,301, filed on Jan. 19, 2010.

(51) Int. Cl.
*H04L 12/66* (2006.01)

(52) U.S. Cl.
USPC ........... 370/352; 370/252; 370/259; 370/351; 709/227

(58) Field of Classification Search
USPC .................. 370/252, 259, 351, 352; 709/227
See application file for complete search history.

(56) References Cited

U.S. PATENT DOCUMENTS

| 5,274,700 | A | 12/1993 | Gechter et al. |
| 5,526,416 | A | 6/1996 | Dezonno et al. |
| 5,581,608 | A | 12/1996 | Jreij et al. |
| 5,598,457 | A | 1/1997 | Foladare et al. |
| 6,094,681 | A | 7/2000 | Shaffer et al. |
| 6,138,143 | A | 10/2000 | Gigliotti et al. |
| 6,185,565 | B1 | 2/2001 | Meubus et al. |
| 6,192,123 | B1 | 2/2001 | Grunsted et al. |
| 6,223,287 | B1 | 4/2001 | Douglas et al. |
| 6,269,336 | B1 | 7/2001 | Ladd et al. |
| 6,425,012 | B1 | 7/2002 | Trovato et al. |
| 6,430,175 | B1 | 8/2002 | Echols et al. |
| 6,434,528 | B1 | 8/2002 | Sanders |
| 6,445,694 | B1 | 9/2002 | Swartz |
| 6,445,776 | B1 | 9/2002 | Shank et al. |
| 6,459,913 | B2 | 10/2002 | Cloutier |
| 6,493,558 | B1 | 12/2002 | Bernhart et al. |

(Continued)

FOREIGN PATENT DOCUMENTS

| DE | 1684587 A | 3/1971 |
| EP | 0282126 A | 9/1988 |

(Continued)

OTHER PUBLICATIONS

U.S. Appl. No. 12/568,646, filed Sep. 2009, Lawson et al.

(Continued)

*Primary Examiner* — Hassan Kizou
*Assistant Examiner* — Deepa Belur
(74) *Attorney, Agent, or Firm* — Jeffrey Schox; Brian Van Osdol

(57) ABSTRACT

A method and system for preserving session state in telephony communication including initializing a communication session of telephony communication between a telephony device and an application server; routing the telephony communication through a call router; storing session state for the communication session of the telephony device and the application server; and transmitting the stored session state in communication between the application server and the call router.

21 Claims, 9 Drawing Sheets

(56) References Cited

U.S. PATENT DOCUMENTS

| | | |
|---|---|---|
| 6,496,500 B2 | 12/2002 | Nance et al. |
| 6,501,832 B1 | 12/2002 | Saylor et al. |
| 6,507,875 B1 | 1/2003 | Mellen-Garnett et al. |
| 6,600,736 B1 | 7/2003 | Ball et al. |
| 6,606,596 B1 | 8/2003 | Zirngibl et al. |
| 6,625,258 B1 | 9/2003 | Ram et al. |
| 6,625,576 B2 | 9/2003 | Kochanski et al. |
| 6,662,231 B1 | 12/2003 | Drosset et al. |
| 6,704,785 B1 | 3/2004 | Koo et al. |
| 6,707,889 B1 | 3/2004 | Saylor et al. |
| 6,711,249 B2 | 3/2004 | Weissman et al. |
| 6,738,738 B2 | 5/2004 | Henton |
| 6,757,365 B1 | 6/2004 | Bogard |
| 6,765,997 B1 | 7/2004 | Zirngibl et al. |
| 6,768,788 B1 | 7/2004 | Langseth et al. |
| 6,778,653 B1 | 8/2004 | Kallas et al. |
| 6,785,266 B2 | 8/2004 | Swartz |
| 6,788,768 B1 | 9/2004 | Saylor et al. |
| 6,792,086 B1 | 9/2004 | Saylor et al. |
| 6,798,867 B1 | 9/2004 | Zirngibl et al. |
| 6,807,529 B2 | 10/2004 | Johnson et al. |
| 6,807,574 B1 | 10/2004 | Partovi et al. |
| 6,819,667 B1 | 11/2004 | Brusilovsky et al. |
| 6,829,334 B1 | 12/2004 | Zirngibl et al. |
| 6,834,265 B2 | 12/2004 | Balasuriya |
| 6,836,537 B1 | 12/2004 | Zirngibl et al. |
| 6,842,767 B1 | 1/2005 | Partovi et al. |
| 6,850,603 B1 | 2/2005 | Eberle et al. |
| 6,873,952 B1 | 3/2005 | Bailey et al. |
| 6,874,084 B1 | 3/2005 | Dobner et al. |
| 6,885,737 B1 | 4/2005 | Gao et al. |
| 6,888,929 B1 | 5/2005 | Saylor et al. |
| 6,895,084 B1 | 5/2005 | Saylor et al. |
| 6,898,567 B2 | 5/2005 | Balasuriya |
| 6,912,581 B2 | 6/2005 | Johnson et al. |
| 6,922,411 B1 | 7/2005 | Taylor |
| 6,931,405 B2 | 8/2005 | El-Shimi et al. |
| 6,937,699 B1 | 8/2005 | Schuster et al. |
| 6,940,953 B1 | 9/2005 | Eberle et al. |
| 6,941,268 B2 | 9/2005 | Porter et al. |
| 6,947,417 B2 | 9/2005 | Laursen et al. |
| 6,961,330 B1 | 11/2005 | Cattan et al. |
| 6,964,012 B1 | 11/2005 | Zirngibl et al. |
| 6,970,915 B1 | 11/2005 | Partovi et al. |
| 6,977,992 B2 | 12/2005 | Zirngibl et al. |
| 6,985,862 B2 | 1/2006 | Strom et al. |
| 7,003,464 B2 | 2/2006 | Ferrans et al. |
| 7,006,606 B1 | 2/2006 | Cohen et al. |
| 7,020,685 B1 | 3/2006 | Chen et al. |
| 7,039,165 B1 | 5/2006 | Saylor et al. |
| 7,062,709 B2 | 6/2006 | Cheung |
| 7,076,428 B2 | 7/2006 | Anastasakos et al. |
| 7,089,310 B1 | 8/2006 | Ellerman et al. |
| 7,140,004 B1 | 11/2006 | Kunin et al. |
| 7,143,039 B1 | 11/2006 | Stifelman et al. |
| 7,197,331 B2 | 3/2007 | Anastasakos et al. |
| 7,197,461 B1 | 3/2007 | Eberle et al. |
| 7,197,462 B2 | 3/2007 | Takagi et al. |
| 7,197,544 B2 | 3/2007 | Wang et al. |
| 7,225,232 B2 | 5/2007 | Elberse |
| 7,227,849 B1 | 6/2007 | Rasanen |
| 7,266,181 B1 | 9/2007 | Zirngibl et al. |
| 7,269,557 B1 | 9/2007 | Bailey et al. |
| 7,272,212 B2 | 9/2007 | Eberle et al. |
| 7,272,564 B2 | 9/2007 | Phillips et al. |
| 7,277,851 B1 | 10/2007 | Henton |
| 7,283,515 B2 | 10/2007 | Fowler |
| 7,286,521 B1 | 10/2007 | Jackson et al. |
| 7,287,248 B1 | 10/2007 | Adeeb |
| 7,298,732 B2 | 11/2007 | Cho |
| 7,308,085 B2 | 12/2007 | Weissman |
| 7,308,408 B1 | 12/2007 | Stifelman et al. |
| 7,324,633 B2 | 1/2008 | Gao et al. |
| 7,324,942 B1 | 1/2008 | Mahowald et al. |
| 7,330,890 B1 | 2/2008 | Partovi et al. |
| 7,340,040 B1 | 3/2008 | Saylor et al. |
| 7,369,865 B2 | 5/2008 | Gabriel et al. |
| 7,376,223 B2 | 5/2008 | Taylor et al. |
| 7,376,586 B1 | 5/2008 | Partovi et al. |
| 7,376,740 B1 | 5/2008 | Porter et al. |
| 7,412,525 B2 | 8/2008 | Cafarella et al. |
| 7,428,302 B2 | 9/2008 | Zirngibl et al. |
| 7,440,898 B1 | 10/2008 | Eberle et al. |
| 7,447,299 B1 | 11/2008 | Partovi et al. |
| 7,454,459 B1 | 11/2008 | Kapoor et al. |
| 7,457,397 B1 | 11/2008 | Saylor et al. |
| 7,486,780 B2 | 2/2009 | Zirngibl et al. |
| 7,496,054 B2 | 2/2009 | Taylor |
| 7,500,249 B2 | 3/2009 | Kampe et al. |
| 7,505,951 B2 | 3/2009 | Thompson et al. |
| 7,519,359 B2 | 4/2009 | Chiarulli et al. |
| 7,522,711 B1 | 4/2009 | Stein et al. |
| 7,536,454 B2 | 5/2009 | Balasuriya |
| 7,552,054 B1 | 6/2009 | Stifelman et al. |
| 7,571,226 B1 | 8/2009 | Partovi et al. |
| 7,613,287 B1 | 11/2009 | Stifelman et al. |
| 7,623,648 B1 | 11/2009 | Oppenheim et al. |
| 7,630,900 B1 | 12/2009 | Strom |
| 7,631,310 B1 | 12/2009 | Hensinger |
| 7,644,000 B1 | 1/2010 | Strom |
| 7,657,433 B1 | 2/2010 | Chang |
| 7,657,434 B2 | 2/2010 | Thompson et al. |
| 7,672,295 B1 | 3/2010 | Andhare et al. |
| 7,675,857 B1 | 3/2010 | Chesson |
| 7,882,253 B2 | 2/2011 | Pardo-Castellote et al. |
| 7,926,099 B1 | 4/2011 | Chakravarty et al. |
| 7,962,644 B1 | 6/2011 | Ezerzer et al. |
| 8,081,958 B2 * | 12/2011 | Soderstrom et al. .......... 455/416 |
| 8,103,725 B2 | 1/2012 | Gupta et al. |
| 8,126,128 B1 | 2/2012 | Hicks, III et al. |
| 8,150,918 B1 | 4/2012 | Edelman et al. |
| 8,266,327 B2 * | 9/2012 | Kumar et al. ................. 709/250 |
| 2002/0006124 A1 | 1/2002 | Jimenez et al. |
| 2002/0006125 A1 | 1/2002 | Josse et al. |
| 2002/0077833 A1 | 6/2002 | Arons et al. |
| 2002/0126813 A1 | 9/2002 | Partovi et al. |
| 2003/0006137 A1 | 1/2003 | Wei et al. |
| 2003/0026426 A1 | 2/2003 | Wright et al. |
| 2003/0046366 A1 | 3/2003 | Pardikar et al. |
| 2003/0051037 A1 | 3/2003 | Sundaram et al. |
| 2003/0059020 A1 | 3/2003 | Meyerson et al. |
| 2003/0061404 A1 | 3/2003 | Atwal et al. |
| 2003/0088421 A1 | 5/2003 | Maes et al. |
| 2003/0123640 A1 | 7/2003 | Roelle et al. |
| 2003/0211842 A1 | 11/2003 | Kempf et al. |
| 2004/0071275 A1 | 4/2004 | Bowater et al. |
| 2004/0101122 A1 | 5/2004 | Da Palma et al. |
| 2004/0172482 A1 | 9/2004 | Weissman et al. |
| 2004/0213400 A1 | 10/2004 | Golitsin et al. |
| 2005/0010483 A1 | 1/2005 | Ling |
| 2005/0025303 A1 | 2/2005 | Hostetler |
| 2005/0135578 A1 | 6/2005 | Ress et al. |
| 2005/0177635 A1 | 8/2005 | Schmidt et al. |
| 2005/0240659 A1 | 10/2005 | Taylor |
| 2005/0243977 A1 | 11/2005 | Creamer et al. |
| 2005/0246176 A1 | 11/2005 | Creamer et al. |
| 2006/0015467 A1 | 1/2006 | Morken et al. |
| 2006/0047666 A1 | 3/2006 | Bedi et al. |
| 2006/0143007 A1 | 6/2006 | Koh et al. |
| 2006/0168334 A1 * | 7/2006 | Potti et al. ..................... 709/239 |
| 2006/0203979 A1 | 9/2006 | Jennings |
| 2006/0209695 A1 | 9/2006 | Archer et al. |
| 2006/0215824 A1 | 9/2006 | Mitby et al. |
| 2006/0217823 A1 | 9/2006 | Hussey |
| 2006/0217978 A1 | 9/2006 | Mitby et al. |
| 2006/0256816 A1 * | 11/2006 | Yarlagadda et al. .......... 370/466 |
| 2006/0262915 A1 | 11/2006 | Marascio et al. |
| 2006/0285489 A1 * | 12/2006 | Francisco et al. ............. 370/229 |
| 2007/0002744 A1 | 1/2007 | Mewhinney et al. |
| 2007/0036143 A1 | 2/2007 | Alt et al. |
| 2007/0050306 A1 | 3/2007 | Mcqueen |
| 2007/0070906 A1 | 3/2007 | Thakur |
| 2007/0070980 A1 | 3/2007 | Phelps et al. |
| 2007/0074174 A1 | 3/2007 | Thornton |

(56) References Cited

U.S. PATENT DOCUMENTS

| | | |
|---|---|---|
| 2007/0121651 A1 | 5/2007 | Casey et al. |
| 2007/0127703 A1 | 6/2007 | Siminoff |
| 2007/0130260 A1 | 6/2007 | Weintraub et al. |
| 2007/0133771 A1 | 6/2007 | Stifelman et al. |
| 2007/0153711 A1 | 7/2007 | Dykas et al. |
| 2007/0192629 A1 | 8/2007 | Saito |
| 2007/0208862 A1 | 9/2007 | Fox et al. |
| 2007/0242626 A1 | 10/2007 | Altberg et al. |
| 2007/0265073 A1 | 11/2007 | Novi et al. |
| 2007/0291905 A1 | 12/2007 | Halliday et al. |
| 2008/0040484 A1* | 2/2008 | Yardley .................. 709/227 |
| 2008/0091843 A1 | 4/2008 | Kulkarni |
| 2008/0104348 A1 | 5/2008 | Kabzinski et al. |
| 2008/0134049 A1 | 6/2008 | Gupta et al. |
| 2008/0146268 A1 | 6/2008 | Gandhi et al. |
| 2008/0152101 A1 | 6/2008 | Griggs |
| 2008/0154601 A1 | 6/2008 | Stifelman et al. |
| 2008/0162482 A1 | 7/2008 | Ahern et al. |
| 2008/0165708 A1 | 7/2008 | Moore et al. |
| 2008/0177883 A1* | 7/2008 | Hanai et al. .................. 709/227 |
| 2008/0209050 A1* | 8/2008 | Li .................. 709/227 |
| 2008/0232574 A1 | 9/2008 | Baluja et al. |
| 2008/0313318 A1 | 12/2008 | Vermeulen et al. |
| 2008/0317222 A1 | 12/2008 | Griggs et al. |
| 2009/0052437 A1 | 2/2009 | Taylor |
| 2009/0052641 A1 | 2/2009 | Taylor |
| 2009/0074159 A1 | 3/2009 | Goldfarb et al. |
| 2009/0075684 A1 | 3/2009 | Cheng et al. |
| 2009/0089699 A1 | 4/2009 | Saha et al. |
| 2009/0093250 A1 | 4/2009 | Jackson et al. |
| 2009/0136011 A1 | 5/2009 | Goel |
| 2009/0171659 A1 | 7/2009 | Pearce et al. |
| 2009/0171669 A1 | 7/2009 | Engelsma et al. |
| 2009/0171752 A1 | 7/2009 | Galvin et al. |
| 2009/0220057 A1 | 9/2009 | Waters |
| 2009/0221310 A1 | 9/2009 | Chen et al. |
| 2009/0222341 A1 | 9/2009 | Belwadi et al. |
| 2009/0225748 A1 | 9/2009 | Taylor |
| 2009/0232289 A1 | 9/2009 | Drucker et al. |
| 2009/0252159 A1 | 10/2009 | Lawson et al. |
| 2010/0037204 A1 | 2/2010 | Lin et al. |
| 2010/0082513 A1 | 4/2010 | Liu |
| 2010/0087215 A1 | 4/2010 | Gu et al. |
| 2010/0088187 A1 | 4/2010 | Courtney et al. |
| 2010/0088698 A1* | 4/2010 | Krishnamurthy .................. 718/1 |
| 2010/0115041 A1 | 5/2010 | Hawkins et al. |
| 2010/0142516 A1 | 6/2010 | Lawson et al. |
| 2010/0150139 A1 | 6/2010 | Lawson et al. |
| 2010/0191915 A1 | 7/2010 | Spencer |
| 2010/0232594 A1 | 9/2010 | Lawson et al. |
| 2010/0235539 A1 | 9/2010 | Carter et al. |
| 2010/0251329 A1 | 9/2010 | Wei |
| 2010/0281108 A1 | 11/2010 | Cohen |
| 2011/0029882 A1 | 2/2011 | Jaisinghani |
| 2011/0078278 A1* | 3/2011 | Cui et al. .................. 709/217 |
| 2011/0081008 A1 | 4/2011 | Lawson et al. |
| 2011/0083179 A1 | 4/2011 | Lawson et al. |
| 2011/0096673 A1 | 4/2011 | Stevenson et al. |
| 2011/0176537 A1 | 7/2011 | Lawson et al. |
| 2011/0211679 A1 | 9/2011 | Mezhibovsky et al. |
| 2011/0280390 A1 | 11/2011 | Lawson et al. |
| 2011/0283259 A1 | 11/2011 | Lawson et al. |
| 2011/0299672 A1 | 12/2011 | Chiu et al. |
| 2011/0320550 A1 | 12/2011 | Lawson et al. |
| 2012/0036574 A1* | 2/2012 | Heithcock et al. .................. 726/19 |
| 2012/0281536 A1* | 11/2012 | Gell et al. .................. 370/235 |
| 2012/0290706 A1 | 11/2012 | Lin et al. |
| 2013/0156024 A1* | 6/2013 | Burg .................. 370/352 |

FOREIGN PATENT DOCUMENTS

| | | |
|---|---|---|
| EP | 1464418 A | 10/2004 |
| EP | 1770586 A1 | 4/2007 |
| ES | 2134107 A | 9/1999 |
| WO | 02087804 | 11/2002 |
| WO | 2009018489 A | 2/2009 |
| WO | 2009124223 A | 10/2009 |
| WO | 2010037064 A | 4/2010 |
| WO | 2010040010 A | 4/2010 |
| WO | 2010101935 A | 9/2010 |
| WO | 2011091085 A | 7/2011 |

OTHER PUBLICATIONS

U.S. Appl. No. 12/572,258, filed Oct. 2009, Lawson et al.
U.S. Appl. No. 12/716,127, filed Mar. 2010, Lawson et al.
Complaint for Patent Infringement, *Telinit Technologies, LLC* v. *Twilio Inc.*, dated Oct. 12, 2012.

* cited by examiner

METHOD AND SYSTEM FOR PRESERVING TELEPHONY SESSION STATE

CROSS-REFERENCE TO RELATED APPLICATIONS

This application claims the benefit of U.S. Provisional Application No. 61/296,301, filed 19 Jan. 2010 and entitled "METHOD AND SYSTEM FOR PRESERVING TELEPHONY MESSAGE STATE", which is incorporated in its entirety by this reference.

TECHNICAL FIELD

This invention relates generally to the telephony application field, and more specifically to a new and useful method and system for preserving telephony state in the telephony application field.

BACKGROUND

Innovations in the web application and Voice over Internet Protocol (VOIP) have brought about considerable changes to the capabilities offered through traditional phone services. New services and platforms have been introduced that integrate telephone voice conversations with website interaction. At the same time the use of SMS (Short Message Service) or MMS (Multimedia Messaging Service) messages, more generically known as text messaging or multimedia messaging, have also become leading forms of communication around the world. However, SMS messages have been limited in the amount of integration with internet applications due to the single message nature of the messaging system. SMS messages have a restricted character limit and correspondingly a limited amount of data that can be associated with a single message. The source of the problem, as discovered by the inventors, is there is no method or system for preserving the telephony message state, so that a single message can be associated with other messages. Additionally, information and application state built up during interactions over phone are not preserved when changing communication channels. Thus, there is a need in the telephony application field to create a new and useful method and system for preserving telephony session state. This invention provides such a new and useful method and system

DESCRIPTION OF THE PREFERRED EMBODIMENTS

The following description of the preferred embodiments of the invention is not intended to limit the invention to these preferred embodiments, but rather to enable any person skilled in the art to make and use this invention.

Figure 1:
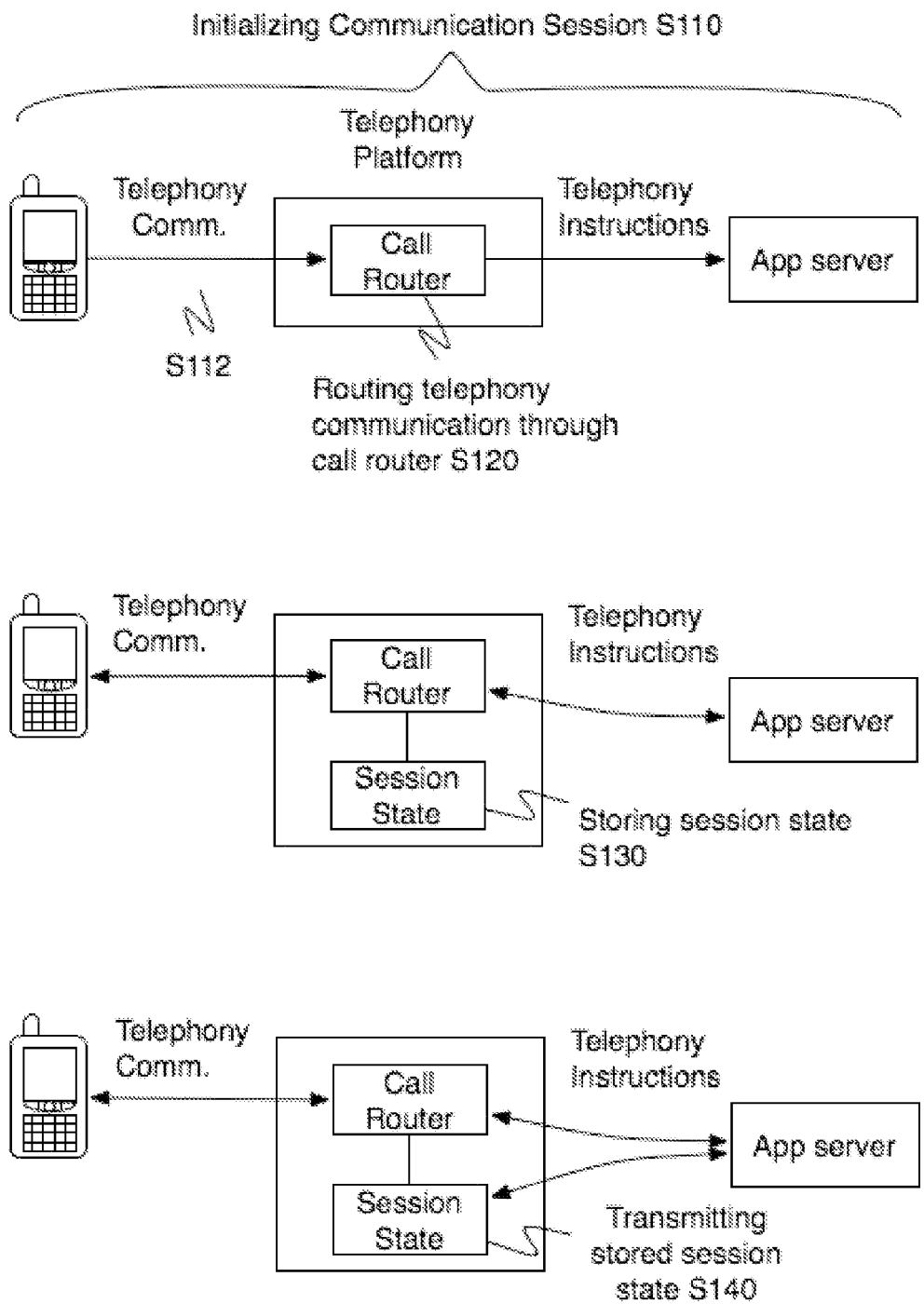
FIGS. 1 and 2 are schematic representations of methods of a first preferred embodiment.
Figure 2:
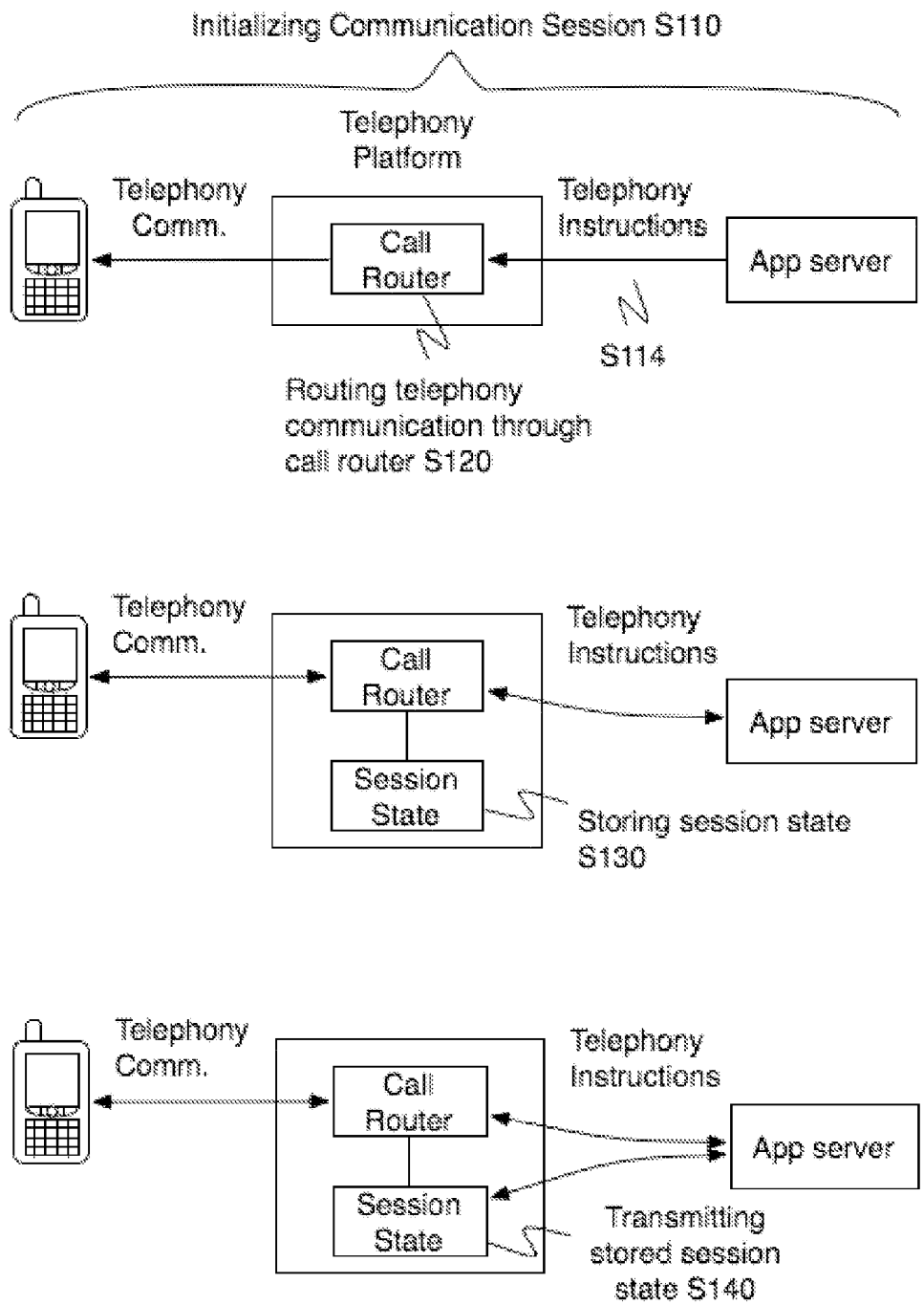

As shown in FIGS. 1 and 2, a method for preserving telephony state of a preferred embodiment includes initializing a communication session of telephony communication between a telephony device and an application server S110; routing the telephony communication through a call router of a telephony platform S120, storing session state for the communication session of the telephony device and the application server S130, and transmitting the stored session state in communication between the application server and the call router S140. The method functions to preserve the state of a communication session between different instances of telephony communication. The method preferably makes state information of past communication available to application servers and/or provides a mechanism for websites to store data about a particular "telephony visitor" (e.g., the device involved in the messaging or past communication information). In one preferred embodiment, the method employs HTTP cookies with telephony communication for preserving application state. The method is preferably implemented on a system capable of handling voice telephone based applications such as the telephony platform described in published U.S. Publication Number 2009/0252159, filed 2 Apr. 2009 and entitled "SYSTEM AND METHOD FOR PROCESSING TELEPHONY SESSIONS", which is incorporated in its entirety by this reference. The method may alternatively be implemented by a system specifically for telephony messaging or be implemented through an application server communicating with a telephony platform or any suitable system. This method may be used with telephony messaging, which includes Short Message Service (SMS) messages, Multimedia Messaging Service (MMS), fax, or any suitable telephony messaging. A communication session preferably involves a plurality of telephony messages in which application state may be preserved. The method may alternatively or additionally be used with voice sessions (i.e, phone calls), video calls, or any suitable sustained communication protocol. The method may be used with a voice session to preserve state during a phone call and/or between multiple calls between the same caller and callee. While in this document telephony messaging and more specifically Short Message Service (SMS) is commonly used as the preferred telephony protocol, any suitable alternative form of telephony communication using any suitable protocol may be used in addition to or instead of telephony messaging or SMS, such as MMS (Multimedia Messaging Service), fax, or voice.

Step S110, which includes initializing a communication session of telephony communication between a telephony device and an application server, functions to send a first telephony message or call request to start a conversation over a telephony network. A communication session is preferably a period of communication between at least one device and an application server. A period of communication preferably includes an initial message or communication and preferably subsequent messages. During the communication session, requests are preferably passed between the application server and the call router which translate to telephony communication between the application server and the telephony device. For example, a communication session for SMS messaging occurring between a device and an application server may include each application server to call router request and SMS message transferred for facilitating the communication between an application server and a device until the session is ended. The communication session may include all communication that occurs between the device and application, but may alternatively be defined to be communication within a time period or any suitable rule for beginning and ending a communication session. The telephony communication is preferably telephony messaging and more preferably an SMS message but may be a MMS message voice or any suitable telephony communication. For voice the communication session may be within a call but more preferably includes a plurality of calls between the same caller and callee. A SMS gateway server preferably connects to a SMS network through a Short Message Service Center ("SMS-C"), directly to the Signaling System #7 (SS7) telephony network, or by any other suitable SMS gateway provider, and the message is preferably received from the gateway by the call router. The call router preferably coordinates the exchange between a telephony device and a networked application server. The telephony device or the application server may initiate the call as exemplified in Steps S112 and S114 below.

As a first alternative, shown in FIG. 1, initializing a conversation preferably includes receiving an incoming SMS message from telephony device S112. The telephony device may be a PSTN-connected (Public Switched Telephone Network) or Internet addressable devices, such as landline phones, cellular phones, satellite phones, Voice-Over-Internet-Protocol (VOIP) phones, SIP (session Initiation Protocol) devices, Skype, Gtalk, or any other suitable PSTN-connected or Internet addressable voice device. The incoming SMS message is preferably received from an originating address. The originating address is preferably a standard phone number, but may be any suitable originating address such as a VOIP provider ID, SMS device number, email address, or a short code. Additional information, such as location, may additionally be captured such as from the area code of the phone number. The SMS message is preferably addressed to a destination address (or an incoming address of an application), which is preferably a standard phone number but may alternatively be a toll free number, a short code number, a long code number, a phone number plus an inputted extension number, a phone number plus a tag included in the message, or any suitable destination address. The contents of the message may additionally impact the associated URI, and keyword or tag in addition to the destination number may impact what application server handles the message. After receiving an incoming SMS message from a telephony device, the call router preferably identifies a URI (Universal Resource Identifier) associated (or "mapped") with the destination address. The initial URI is preferably pre-specified at the call router by a web application (which may be running on a third party server) or call router account owner. More preferably, the initial URI is assigned to the incoming SMS message via a unique identifier for the call destination, such as a DID (Direct Inbound Dial) phone number, or a VOIP SIP address. In one variation the SMS system operates within a larger telephony application system, and multiple applications may be associated with a single incoming address. In this variation the URI is identified based on the destination address and the type of incoming message (SMS, MMS, voice call, fax etc.). In other words, a different URI may be identified depending on the source of the telephony session. For example, a voice call or a fax might have different initial URI's that would handle a telephony session initiated by these alternative devices.

As a second alternative, shown in FIG. 2, initializing a conversation preferably includes receiving a message request from an application server S114. The SMS message request preferably includes the message context, the text if the request is an SMS message, the media if the message is a MMS, or other content for other forms of telephony communication. The message request may additionally include a response URI that includes the URI to direct messages received in reply to the message initiated by the application server, alternatively the initial URI assigned to the application server may be used. As a first variation, the instructions from the application server may be in the form of a telephony instruction or a command included in the HTTP communication between the call router and the application server. A call router preferably processes telephony instructions to convert a server response into telephony actions or executable operations during a telephony session. A server response is preferably received over HTTP and is preferably formatted as XML. The call router may additionally process the telephony instructions according to the mime-types associated with the server response. For example, if the response mime-type is XML, it is considered to be a set of call router instructions. If the response mime-type is MP3, JPEG, video file, or other media file, it is considered to be media that should be sent as a MMS. If the response type is plain text, it is considered to be text that should be sent as a SMS.

As a variation of Step S114, the SMS message request from the application server may alternatively be issued through a Call Router API. The Call Router API is preferably an application programming interface (API) such as a REST API (Representational State Transfer) as is known in the art, but the Call Router API may alternatively be a SOAP (Simple Object Access Protocol) API or any suitable programmatic communication interface. A message request is preferably communicated to the call router via the Call router API, and the call router then preferably proceeds to send the message during Step S120. An application server or any suitable HTTP enabled device may use the Call Router API to initiate sending a SMS message to a device that is preferably specified by a phone number, VOIP provider ID, SMS device number, email address, short code, or any suitable telephony device address.

Step S120, which includes routing the telephony communication through a call router of a telephony platform, functions to forward the telephony communication to a destination. In the variation where an incoming telephony message is received from a device, the telephony message is included in an HTTP or HTTPS message to the application server specified by the identified URI. In the variation where an application server initiates the sending of a telephony message, the application server preferably communicates with the call router, and the call router preferably sends the telephony message to a device specified by a telephony address. As mentioned above, the application server communicating with the call router is preferably achieved through a telephony instruction or the Call Router API, but any suitable framework may be used.

Figure 3:
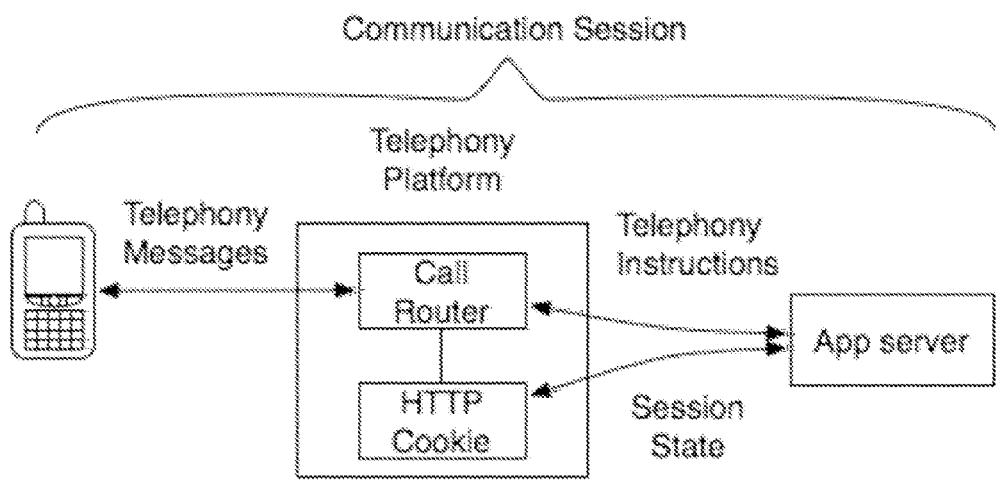
FIG. 3 is a schematic representation of a HTTP cookie variation of a preferred embodiment.

Step S130, which includes storing session state for the communication session of the telephony device and the application server, functions to provide a resource for preserving state of application interaction for a telephony device and an application. The session state preferably uniquely identifies the communication session created by the telephony device and the application communicating. The session state is preferably defined by a tuple including a "to" and "from" field that include the caller and the callee information of the telephony device and application server. The participants of the telephony communication may alternatively be defined through any suitable construct. Data of a session state is preferably stored in an HTTP Cookie, as shown in FIG. 3. Alternatively, the session state may be stored using any suitable website session storage mechanism. The HTTP cookie is preferably managed by the telephony platform and may be stored by the call router. A cookie is preferably stored for each communication established through the telephony platform. The to-field and from-field defining the session state is preferably used to identify a corresponding cookie. An application server can preferably utilize the cookie for applications similar to those of browser based interactions. Each device accessing an application server preferably simulates or appears as a browser from the perspective of the application server, and a cookie can preferably be created for each device address accessing an application server. The cookie can be used by the application server to preserve user preferences, a browsing session, or other data for an application. telephony address (e.g., phone number) and the callee telephony address.

Figure 4:
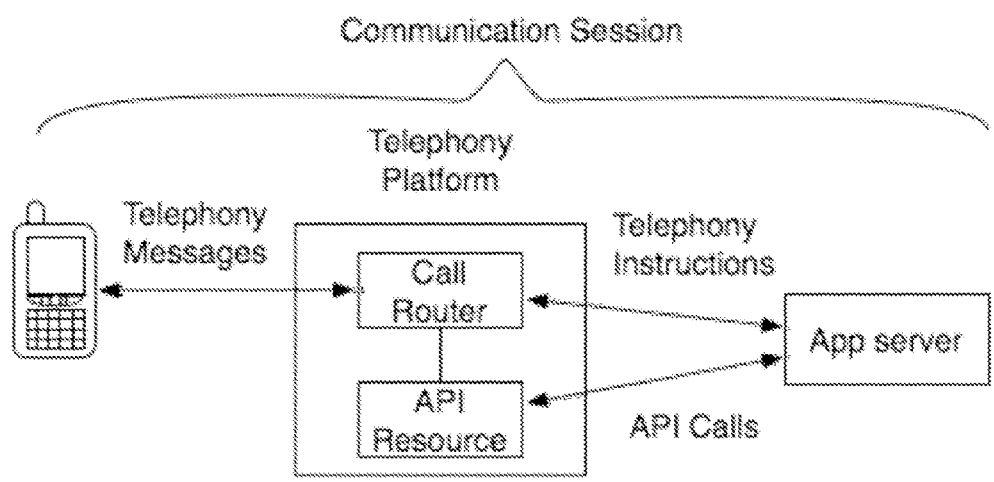
FIG. 4 is a schematic representation of a API resource variation of a preferred embodiment.

Additionally or alternatively, session state may be stored as a call router API resource that the application server may access through the call router API, as shown in FIG. 4. The call router API preferably stores state information in a persistent URI for a resource. The API resource may function substantially to the HTTP cookie described above, but may additionally store other information such as communication history. The persistent URI preferably contains all the necessary state information, and this preferably makes data persistent, queryable, and recoverable. The application server or another device may later access the data of the persistent URI to determine the state of the conversation. Specifically, a session history resource is preferably created that is accessible through the call router API. The to-field and from-field is preferably included in the request to identify the data of the session state. A full transcript, individual messages, media files (original and MMS formatted messages), response URI's, meta data such as time stamps, and any suitable data on the conversation may be accessible through the call router API. Session history may include saving the content and actions associated with messages sent between a device and an application server. Often an application server will reply to a telephony message from a device. Session state of these replies are preferably preserved and communicated in substantially the same manner as an initial telephony message (e.g., by a telephony instruction or through a Call Router API). Though the reply is preferably sent to the originating address of the device (as opposed to some specified address of the application server). Additionally, the application server can preferably specify a response URI for future messages from a device. The call router will preferably pass the next message received from the device to the reply URI as opposed to the initial URI discussed above. In the course of executing a telephony message application, there may be a plurality of messages passed between a device and an application server. The storing of state of a conversation additionally functions to support these multi-message applications. A transcript or history of past messages are preferably stored as part of the state of the conversation. By preserving the state of the conversation, SMS messages become a full conversation as opposed to unrelated, single messages.

Additional abstractions of the history of conversations may additionally be made. As one abstraction, a concept of sessions may be introduced which can be used to group a plurality of related messages. Such sessions may be assigned based on the temporal spacing of the messages. For example, a session may be closed after an expiration time requirement is met and the next message marks the beginning of a new session. An application server may alternatively define the beginning and end of a session. For example, the application server may send a telephony instruction or call router API message to signal the beginning and the conclusion of a session. This may additionally be signaled through the session state.

Step S140, which includes transmitting the stored session state in communication between the application server and the call router, functions to communicate the session state to the application server. The session state may be used by the application server to set application state or for any suitable application. Preferably, the session state HTTP cookie is sent to the application server for all communication with the application server. As described above the call router preferably communicates with the application server through HTTP or HTTPS. The HTTP cookie is preferably transmitted through these techniques. Alternatively, if the session state is stored as an API resource, then the session state is transmitted in response to an API call. The session state may alternatively be stored on the application server, or communicated to the application server in any suitable manner.

Figure 5:
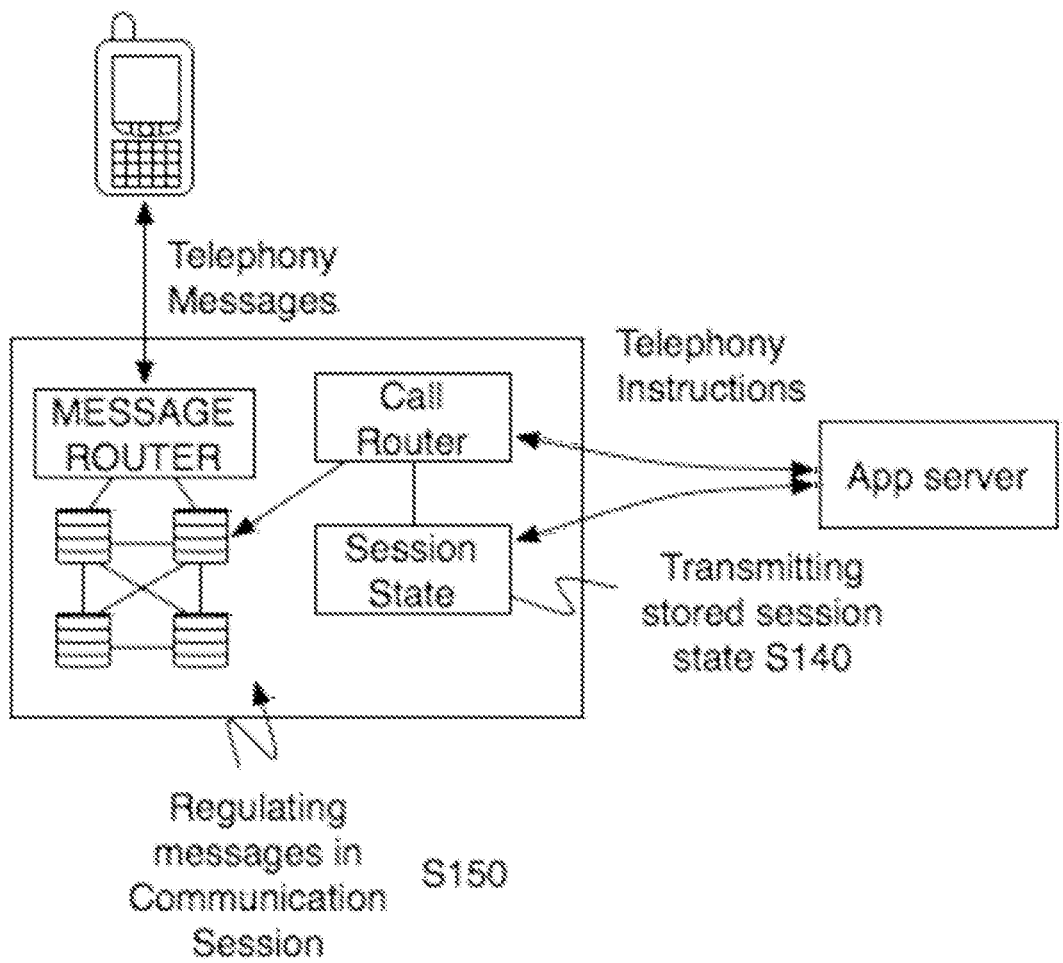
FIG. 5 is a schematic representation of regulating telephone messages of a preferred embodiment.

Additionally, the method may include regulating within a communication session S150 as shown in FIG. 5, which functions to place restrictions on forms of communication within a communication session. In particular this may include limiting the speed and number of telephony messages that may be sent. When sending telephony messages from the call router, the telephony messages may be queued to manage the load on the telephone network used by the call router. The queue functions to control network resources shared between a plurality of application servers sending telephony messages, and also to individually control the rate of telephony messages from an application server and avoid any network limitations such as SMS or MMS filtering, labeling as spam, or forced throttling. There are preferably a plurality of queues managed by the call router which may be allocated and deallocated according to resource demand. There is preferably a queue for each communication session. The queues may alternatively be shared amongst entities involved in various communication sessions. A dequeuer (or popper) preferably manages the selection of items from the queue to send from the call router. There may additionally be a plurality of dequerers for the plurality of queues, and each queue may have multiple dequerers selecting items from the queue. The dequeuers preferably dynamically control the rate and number of messages selected from the queue. Messages and/or calls may be rate limited for a particular communication session. Rate limiting may include limiting the number of messages/calls in a time period, time period between messages/calls, and/or any suitable rule for limiting communication. When sending a telephony message, the call router may additionally handle formatting of the contents of the telephony message. This substep functions to alleviate application servers from correctly formatting all messages before communicating with the call router. As one example, a message may have more than the allowed number of characters (e.g., 160 characters) in a SMS message. The call router preferably splits the message into multiple SMS message requests to satisfy the character limit. Each SMS message request is then preferably individually queued. The message may additionally be split based on the contents of the text to prevent splitting a word, phrase, or sentence between different messages. In other words, the message is preferably split to preserve the semantic meaning of the message by analyzing the grammar and written structure of the message. Additionally, content may be added to the message such as the name of the source of the text message or the page number (e.g., "1 of 3:") in the case of a split message. In the case of MMS messages, the media may be compressed, resized, converted to an appropriate format, or replaced with a web link to the media file (if the media is not compatible with MMS). Related to the split messages, the call router may combine split messages sent from a device into a single message. This is preferably implemented by delaying the passing of a message to an application server, and combining additional messages into a single message before passing the message to an application server. Any suitable pre-processing of application server messages and post-processing of device messages may alternatively be used.

Figure 6:
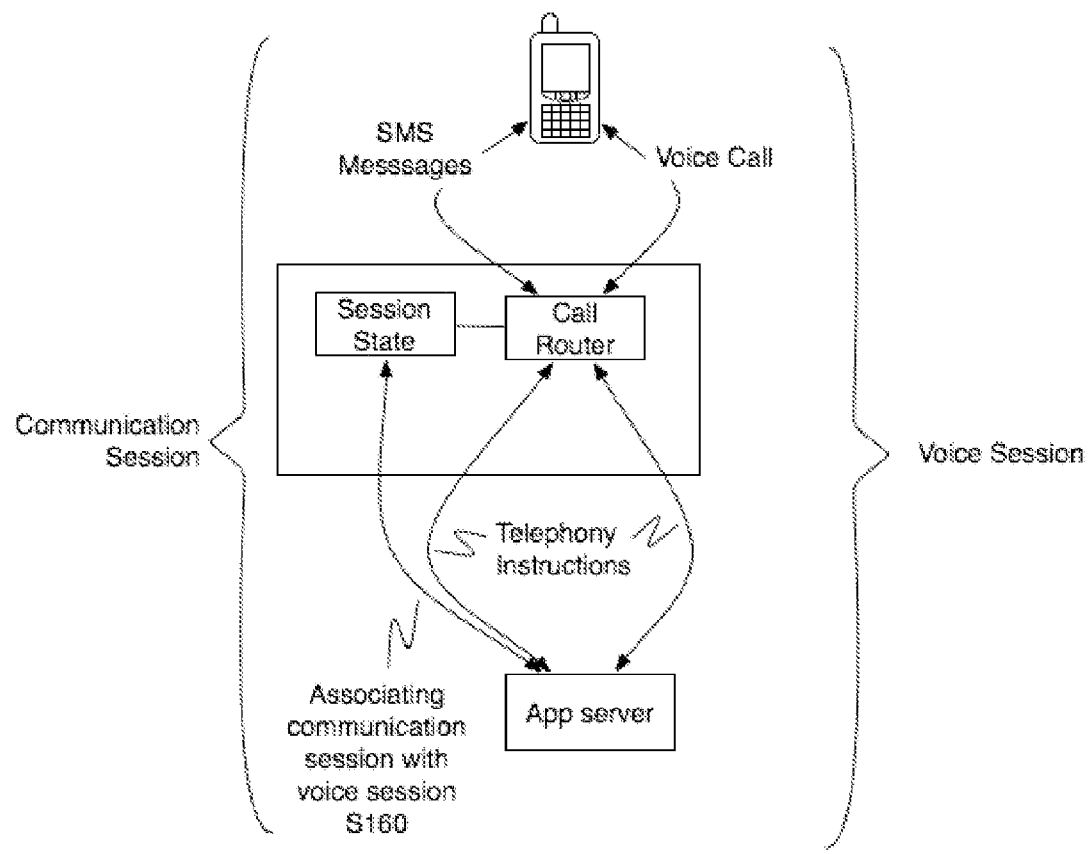
FIG. 6 is a schematic representation of associating a communication session with a voice session of a preferred embodiment.

Additionally, the method may include associating the communication session with a voice session S160 as shown in FIG. 6, which functions to allow the session state of a communication session to be used by a voice session. For example, while performing SMS messaging with an application, a voice session may be initiated from the same device to the application, and the session state of the previous SMS communication session may be used within the voice session. Similarly, the step may include merging voice call session state with a SMS conversation. This step may be applied to enable merging session state of numerous forms of communication. This preferably involves sharing session state between communication sessions with different mediums of conversation (e.g., voice and SMS). This is particularly applicable on telephone networks capable of simultaneous voice and data transmission. Some applications may call for SMS messages or MMS messages to be sent during a telephone conversation with an application server. The session state is preferably associated with a second communication session by using the same HTTP cookie for communication between the call router and the application server or alternatively copying the HTTP cookie. As another alternative, the API resources storing the session state may be accessed for use with either communication session. The telephone conversation (i.e., voice session) can preferably be a standard two party call (between two telephony devices with the call router in between or between a telephony device and an application server) or a multi party conference call. In this alternative resources generated during a voice session such as recordings, transcriptions, DTMF (Dual-Tone Multi-Frequency) signal inputs, or any suitable resources created during a voice session are preferably associated with the session history resource. Preferably the resources of the voice session are included as part of the conversation resource but they may alternatively be referenced or a shared identification code may be used.

Figure 7:
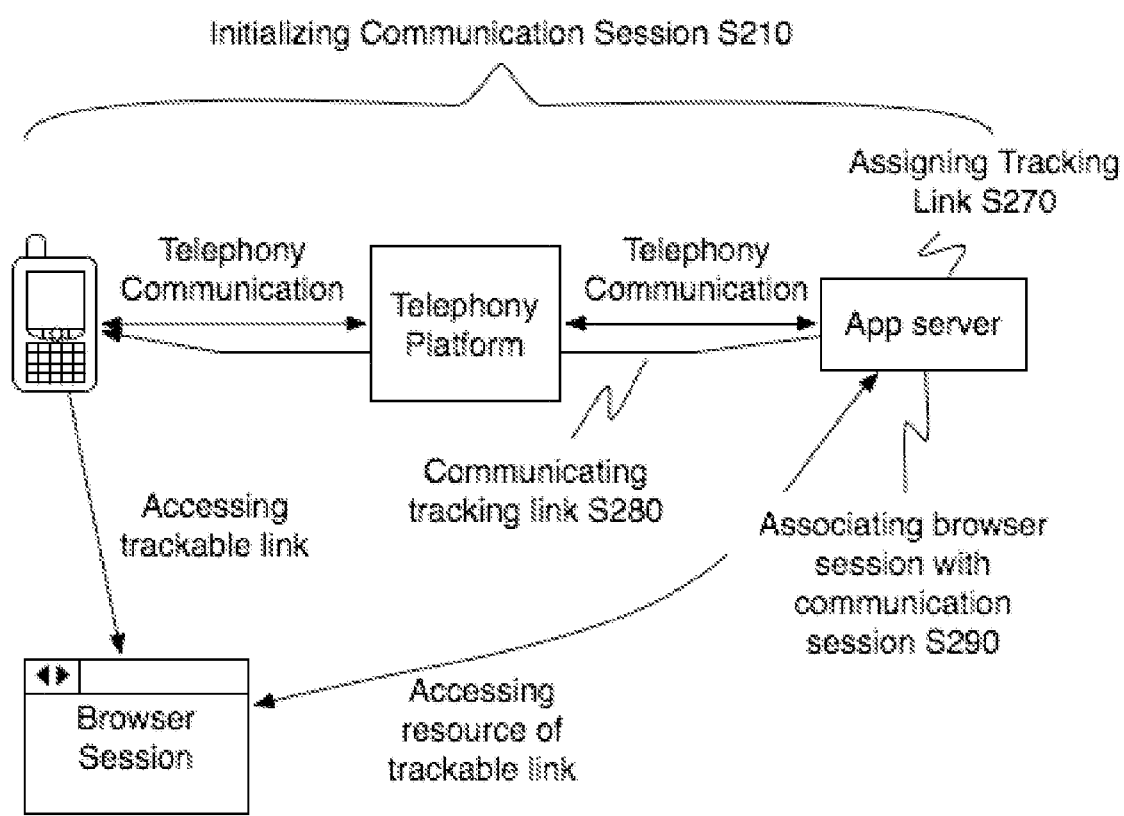
FIGS. 7 and 8 are schematic representations of methods of a second preferred embodiment.
Figure 8:
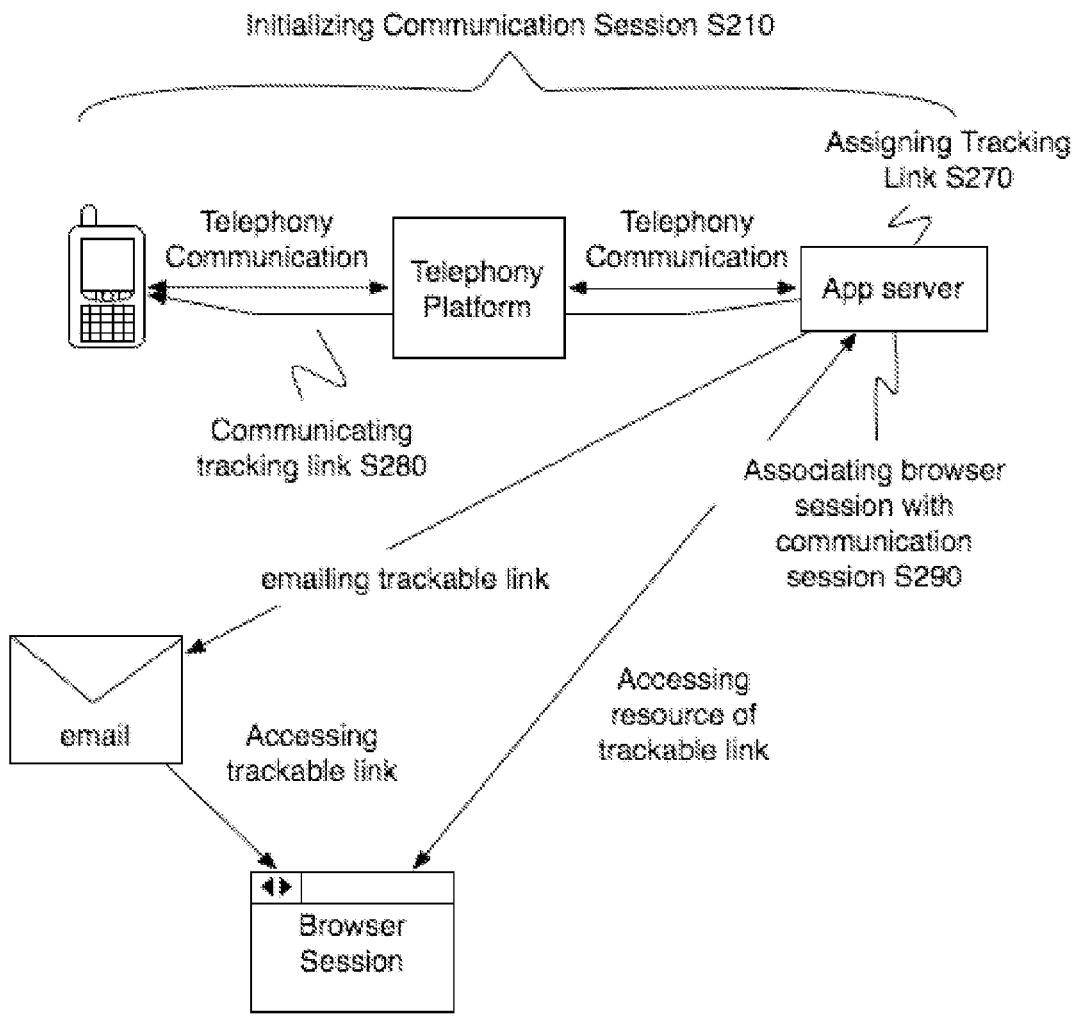
Figure 9:
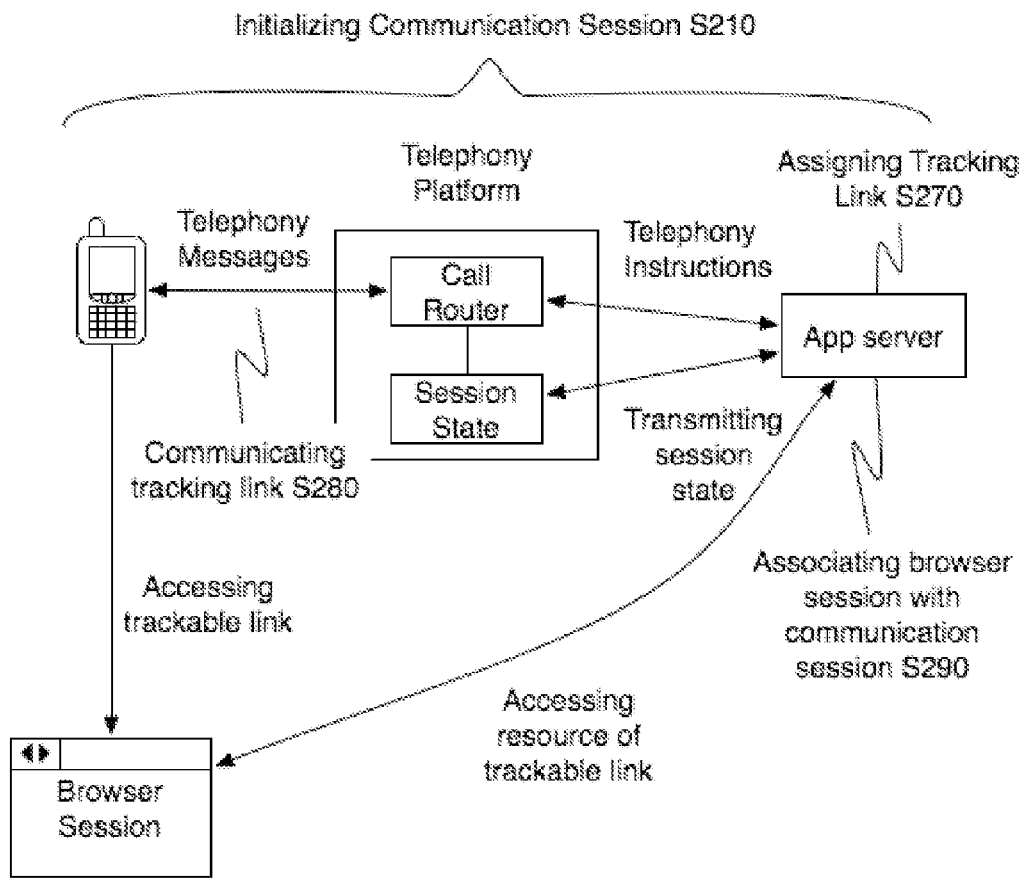
FIG. 9 is a schematic representation of a variation of the first and second preferred embodiments.

As shown in FIGS. 7 and 8, a second preferred embodiment the method may include the steps of initializing a communication session with a telephony message between a telephony device and an application server S210, and additionally assigning a unique tracking link to the communication session S270, communicating the tracking link S280, and associating resource access made through the tracking link with the communication session S290. Method functions to preserve session state between modes of communication. This is particularly useful for associating browser sessions with telephony sessions that involve the same parties. For example, data entered during a phone call can be imported into a web application accessed through a browser. Step S120 is preferably substantially similar to Step S110 described above. Additionally the Steps S120, S130, S140, S150, and/or S160 may all be used in combination with the additional steps of S270, S280, and/or S290 as shown in FIG. 9. The tracking link preferably functions as a way for triggering an association with a communication session when accessing a resource. This is preferably used for associating telephony sessions with browser sessions, but may be used to associate a telephony session with any suitable session such as an application session.

Step S270, which includes assigning a unique tracking link to the communication session, functions to create a sharable link to a resource that can be used to identify the entity accessing the resource. The tracking link is preferably a URI that includes parameters that associate a communication session with the URI. The URI may alternatively route the user initially through an initial site for tracking, similar to a link shortening service. The tracking link preferably leads to a webpage, but may alternatively direct to other resources such as an application. The tracking link may alternatively open up an application on a device. The resource opened by the tracking link is preferably operated by the application server entity but may be operated by any suitable party, preferably one with access to information of the communication session. Thus resource access and communication session information are both available to the application server entity or outside entity.

Step S280, which includes communicating the tracking link, functions to deliver the tracking link for user access. The tracking link may be sent in a SMS message as shown in FIG. 7, an email message as shown in FIG. 8, fax, over audio, in an image or video, or communicated through any suitable means. The communication of the tracking link is preferably initiated by an application server during or following a telephony communication session.

Step S290, which includes associating resource access made through the tracking link with the communication session, functions to associate a communication session with the access of a resource. When the tracking link is used to access the resource, the communication session associated with that particular tracking link is preferably identified. Preferably, session state or other resources associated with the communication session can then be used within this newly accessed resource (e.g., webpage or application). For example, after being sent a link in an SMS message, a user may click the link and a browser of the phone preferably opens the link to a resource hosted by the application server. Since the link was uniquely assigned for that communication session, the application server knows that the user opening this browser session must have some connection to the user participating in SMS conversation. Information gathered during the SMS conversation can be used to impact the resource accessed by the user. The device opening the tracking link need not be the same device where the communication session occurred. Since the tracking link is unique and preferably shared with the user(s) of the communication session, an application server can assume that the user(s) is the same.

Figure 10:
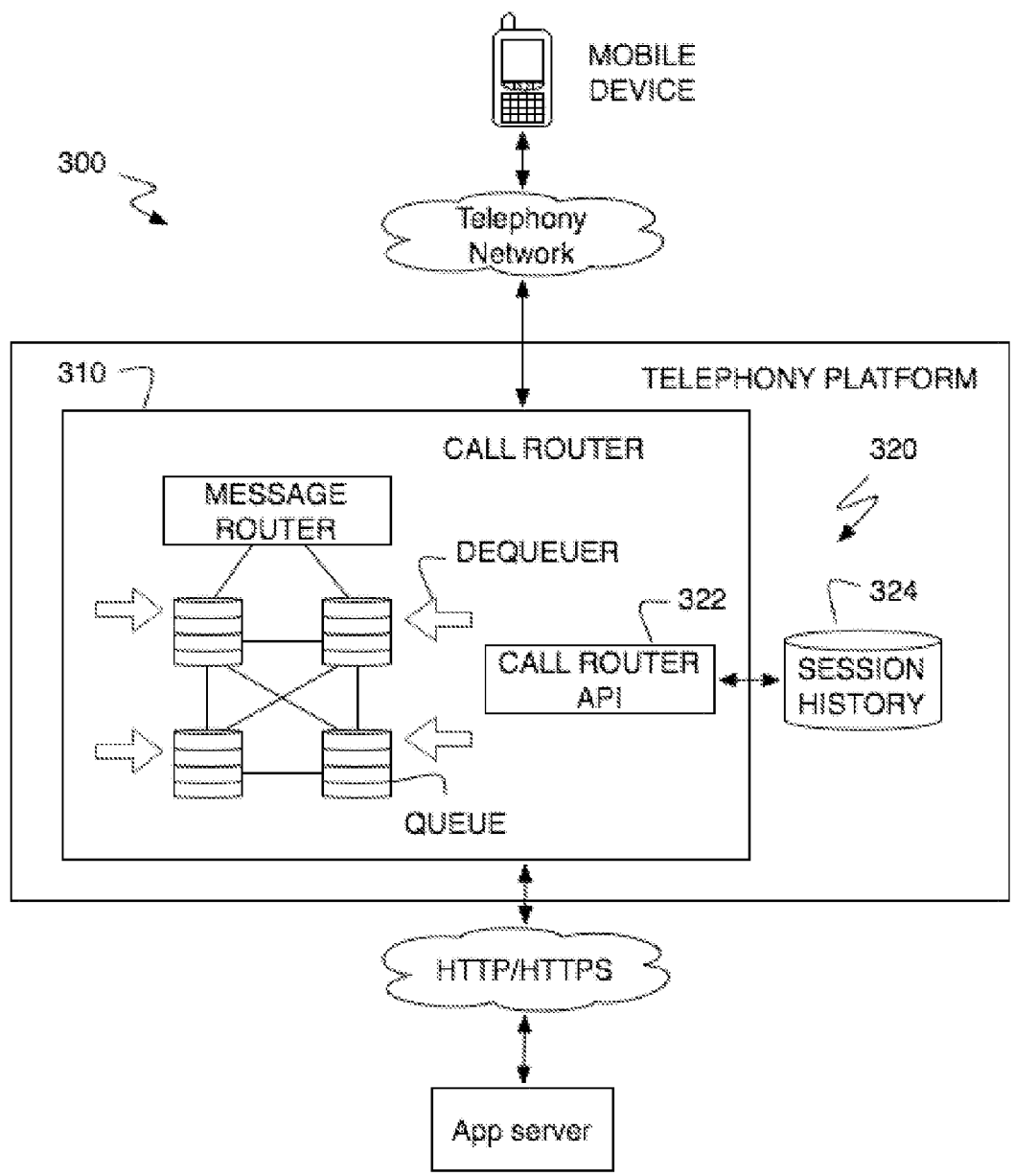
FIG. 10 is a schematic representation of a system of a preferred embodiment.

As shown in FIG. 10, a system 300 for preserving telephony message state of the preferred embodiment preferably includes a call router 310 and a session state manager 320. The system functions to store and make session state accessible for telephony messages passed between a device and an application server. The call router 310 preferably includes a message router for sending and receiving SMS/MMS messages. The call router 310 can preferably connect to an SMS network SMS through a Short Message Service Center ("SMS-C"), directly to the Signaling System #7 (SS7) telephony network, or by any other suitable SMS gateway provider. The message router can preferably send and receive messages from SMS network devices, cellular phones, computers, smartphones, or any suitable SMS network devices. The call router 310 may additionally or alternatively send or receive text messages or multimedia messages different protocols, emails, faxes, make voice calls over PSTN (Public Switched Telephone Network) network, and other suitable PSTN-compatible communication messages. The communication between the application server and the call router 310 is preferably stateless and any state information (e.g., call state) or data is preferably located in a URI or the request parameters, such as HTTP headers, GET URI parameters, POST request body parameters, or HTTP cookies. The session state manager 320 preferably functions to store and communicate stored session state. Preferably, this includes infrastructure to store and transmit HTTP cookies used to store session state for communication sessions involving a device and telephony application. Session state is stored within an HTTP cookie unique for a communication session, and the HTTP cookie can be transmitted to application servers for application logic. The session state manager may alternatively or additionally include a call router API 322 and a session history resource 324. The session history resource 324 is preferably stored data related to the conversation created between a device and an application server (either a single message or a plurality of messages). The conversation resource 324 is preferably a resource of the call router API 322, but may alternatively be a cookie or any suitable device to store state information. The system may additionally include a plurality of queues, a plurality of dequeuers (i.e., queue poppers), which functions to balance resource usage of the messaging network. The queues and dequeuers can preferably be allocated and deallocated from the system to account for capacity requirements. The system may encourage a plurality of messages to be sent which may cause increased load on the network. The queue and the dynamic allocation of resources preferably provide a device to compensate for a large volume of messages. The queues and/or dequeuers preferably function to control the throttling (i.e., service rates) of message requests. The throttling may be performed on a per-phone number, per-account (as in a multi-tenant application), and/or according to any message attribute.

An alternative embodiment preferably implements the above methods in a computer-readable medium storing computer-readable instructions. The instructions are preferably executed by computer-executable components preferably integrated with a telephony platform and/or application server. The computer-readable medium may be stored on any suitable computer readable media such as RAMs, ROMs, flash memory, EEPROMs, optical devices (CD or DVD), hard drives, floppy drives, or any suitable device. The computer-executable component is preferably a processor but the instructions may alternatively or additionally be executed by any suitable dedicated hardware device.

As a person skilled in the art will recognize from the previous detailed description and from the figures and claims, modifications and changes can be made to the preferred embodiments of the invention without departing from the scope of this invention defined in the following claims.

We claim:

1. A method for preserving session state in telephony messaging comprising:
   at a telephony platform, initializing a communication session with a telephony communication between a telephony device and an application server;
   at a call router of the telephony platform, communicating the communication session over a telephony protocol to the telephony device and communicating the communication session over HTTP protocol to the application server;
   at the telephony platform, storing session state that uniquely identifies the communication session of the telephony device and the application server;
   at the call router, transmitting the stored session state in subsequent communications of the communication session with the application server;
   communicating a tracking link to a user access destination in response to initiation by the application server, wherein a tracking link is a link to a resource and the tracking link is unique to the communication session; and
   associating access of the resource through the tracking link with the session state of the communication session.

2. The method of claim 1, wherein the session state is defined by a to-field and from-field of the communication session.

3. The method of claim 2, wherein the session state is further defined by a rule for the communication session time period.

4. The method of claim 2, wherein transmitting the stored session state includes transferring session state data through an HTTP Cookie identified from the to-field and from-field of the session state.

5. The method of claim 4, wherein the telephony communication is an SMS message.

6. The method of claim 4, wherein the telephony communication is a voice call.

7. The method of claim 1, wherein data of the session state is stored as an API resource accessible through an API of the telephony platform; and wherein transmitting the stored session state data includes transferring session state data through an API call identifying a session state by a to-field and from-field.

8. The method of claim 1, further comprising regulating communication within a communication session.

9. The method of claim 8 wherein regulating includes queuing telephony communication and rate limiting telephony communication within a communication session determined by the session state.

10. The method of claim 1, wherein the tracking link is a universal resource identifier (URI) and resource access is made through a web browser; and
    wherein associating resource access includes associating the browser session with the communication session.

11. The method claim 1, wherein the telephony communication is telephony messaging; and further comprising associating the communication session with a voice communication session of the telephony platform.

12. The method of 11, wherein the session state is stored as an HTTP cookie, and wherein associating the communication session with a voice session further comprises sharing the HTTP cookie with the voice communication session and transmitting the HTTP cookie to an application server of the voice communication session.

13. The method of claim 1, wherein a telephony communication is an SMS message, and wherein the tracking link is communicated through an SMS message.

14. The method of claim 1, wherein the tracking link is communicated in an email message.

15. A method for preserving session state between plurality of communication channels comprising:
    at an application server, initializing a communication session between a telephony device and an application server system, wherein the communication session comprises HTTP communication between the application server system and a call router of a telephony platform and telephony protocol communication between the call router and the telephony device;

at the telephony platform, storing session state that uniquely identifies the communication session between the telephony device and the application server system;

at the call router, transmitting the stored session state in subsequent communications of the communication session with the application server;

at the application server system, assigning a unique tracking link to the communication session;

at the application server system, initiating communication of the tracking link to a user access destination; and at the application server system, associating server resource access made with the tracking link with the session state of the communication session.

16. The method of claim 15, wherein the communication session is a telephony voice session.

17. The method of claim 15, wherein the tracking link is a URI and resource access is made through a web browser; and wherein associating resource access includes associating the browser session with the communication session.

18. The method of claim 15, wherein the resource access includes opening an application indicated through the tracking link.

19. The method of claim 15, wherein the tracking link is communicated through an SMS message.

20. The method of claim 15, wherein the tracking link is communicated through an email message.

21. A method for preserving session state in telephony communication comprising:

at a telephony platform, initializing a communication session in response to a received telephony communication or in response to a received telephony communication API request;

at a call router of the telephony platform, communicating over a telephony protocol with a telephony device, communicating over HTTP protocol with an application server, and executing telephony instructions for the communication over the protocol according to received communication from the application server;

at the telephony platform, storing a session state cookie for the communication session of the telephony device and the application server, wherein the session state cookie is uniquely defined at least in part by the to-field and from-field of the communication session;

a call router, transmitting the stored session state cookie to the application server in subsequent HTTP communication of the communication session; and communicating a tracking link to a user access destination in response to initiation by the application server, wherein a tracking link is a link to a resource and the tracking link is unique to the communication session; and associating access of the resource with the tracking link with the session state cookie of the communication session.

* * * * *